(12) United States Patent
Rudakevych et al.

(10) Patent No.: US 9,346,499 B2
(45) Date of Patent: May 24, 2016

(54) RESILIENT WHEEL ASSEMBLIES

(75) Inventors: Pavlo E. Rudakevych, Arroyo Grande, CA (US); Garran M. Gossage, San Luis Obispo, CA (US); Christopher L. Morey, San Luis Obispo, CA (US); Todd M. Meaney, San Luis Obispo, CA (US); Timothy R. Ohm, Grover Beach, CA (US)

(73) Assignee: IROBOT CORPORATION, Bedford, MA (US)

( * ) Notice: Subject to any disclaimer, the term of this patent is extended or adjusted under 35 U.S.C. 154(b) by 1182 days.

(21) Appl. No.: 13/340,957

(22) Filed: Dec. 30, 2011

(65) Prior Publication Data

US 2012/0200149 A1  Aug. 9, 2012

Related U.S. Application Data

(60) Provisional application No. 61/436,994, filed on Jan. 27, 2011.

(51) Int. Cl.
*B62D 55/075* (2006.01)
*B60B 9/26* (2006.01)
(Continued)

(52) U.S. Cl.
CPC ............... *B62D 55/075* (2013.01); *B60B 9/26* (2013.01); *B62D 55/0885* (2013.01); *F41H 7/005* (2013.01); *B29C 45/00* (2013.01); *B29L 2031/32* (2013.01); *B62D 55/12* (2013.01)

(58) Field of Classification Search
CPC .. B62D 55/06; B62D 55/075; B62D 55/0885; B60B 9/26; F41H 7/005; A63H 17/004
See application file for complete search history.

(56) References Cited

U.S. PATENT DOCUMENTS 1,103,295 A * 7/1914 Jordan ............................ 152/86
1,162,706 A * 11/1915 Myers ............................. 152/86
(Continued)

FOREIGN PATENT DOCUMENTS

CN  101492072 A  7/2009
JP   60176871 A * 9/1985
(Continued)

OTHER PUBLICATIONS

European Search Report for Application No. 12152964.8 dated Dec. 13, 2012.
(Continued)

*Primary Examiner* — Kip T Kotter
(74) *Attorney, Agent, or Firm* — Jenkins, Wilson, Taylor & Hunt, P.A.

(57) ABSTRACT

A wheel assembly for a remote vehicle comprises a wheel structure comprising a plurality of spokes interconnecting a rim and a hub. The spokes comprise at least one slit extending therethrough radially inward from the rim to the hub. The assembly also comprises a flipper structure comprising an arm, a plurality of legs, and an attachment base. The plurality of legs and the attachment base comprise a four-bar linkage. The assembly further comprises an insert comprising a bore with a flat surface that tapers outward from a top portion to a bottom portion of the insert. The insert being configured to couple the flipper structure to the wheel structure via an axle on the remote vehicle and prevent backlash between the axle and the flipper structure. The flipper structure being configured to transmit axial forces to the wheel structure. The wheel structure being configured to absorb radial and axial forces.

18 Claims, 13 Drawing Sheets

(51) Int. Cl.
*B62D 55/088* (2006.01)
*F41H 7/00* (2006.01)
*B29C 45/00* (2006.01)
*B29L 31/32* (2006.01)
*B62D 55/12* (2006.01)

(56) References Cited

U.S. PATENT DOCUMENTS

| | | | |
|---|---|---|---|
| 1,358,575 A | 11/1920 | Rimailho | |
| 1,509,030 A | 9/1924 | Roy | |
| 1,592,654 A | 7/1926 | Bremer | |
| 3,166,138 A | 1/1965 | Dunn | |
| 3,417,832 A | 12/1968 | Ziccardi | |
| 3,489,236 A | 1/1970 | Goodwin | |
| 4,483,407 A | 11/1984 | Iwamoto et al. | |
| 4,702,331 A | 10/1987 | Hagihara et al. | |
| 4,727,949 A | 3/1988 | Rea et al. | |
| 4,932,831 A | 6/1990 | White et al. | |
| 5,022,812 A | 6/1991 | Coughlan et al. | |
| 5,040,626 A | 8/1991 | Paynter | |
| 5,413,454 A | 5/1995 | Movsesian | |
| 5,435,405 A | 7/1995 | Schempf et al. | |
| 5,451,135 A | 9/1995 | Schempf et al. | |
| 5,513,716 A | 5/1996 | Kumar et al. | |
| 6,113,343 A | 9/2000 | Goldenberg et al. | |
| 6,263,989 B1 | 7/2001 | Won | |
| 6,361,570 B1 | 3/2002 | Gow | |
| 6,428,266 B1 | 8/2002 | Solomon et al. | |
| 6,431,296 B1 * | 8/2002 | Won | 180/9.32 |
| 6,523,629 B1 | 2/2003 | Buttz et al. | |
| 6,615,885 B1 * | 9/2003 | Ohm | 152/11 |
| 6,668,951 B2 | 12/2003 | Won | |
| 6,837,318 B1 | 1/2005 | Craig et al. | |
| 6,939,197 B1 * | 9/2005 | Hoeting | A63H 17/004 446/437 |
| 7,266,421 B1 | 9/2007 | Blayrac et al. | |
| 7,348,747 B1 | 3/2008 | Theobold et al. | |
| 7,468,592 B2 | 12/2008 | Lim et al. | |
| 7,475,745 B1 | 1/2009 | DeRoos | |
| 7,546,891 B2 * | 6/2009 | Won | 180/9.32 |
| 7,581,605 B2 | 9/2009 | Caspi et al. | |
| 7,645,110 B2 | 1/2010 | Ogawa et al. | |
| 7,654,348 B2 | 2/2010 | Ohm et al. | |
| 7,793,743 B2 | 9/2010 | Kamimura | |
| 8,002,365 B2 | 8/2011 | Jacobsen et al. | |
| 8,074,752 B2 * | 12/2011 | Rudakevych | 180/9.32 |
| 8,122,982 B2 * | 2/2012 | Morey et al. | 180/9.32 |
| 8,353,373 B2 * | 1/2013 | Rudakevych | 180/9.32 |
| 8,360,178 B2 | 1/2013 | Goldenberg et al. | |
| 8,573,335 B2 * | 11/2013 | Rudakevych | 180/9.32 |
| 8,918,214 B2 | 12/2014 | Bosscher et al. | |
| 2001/0047895 A1 | 12/2001 | De Fazio et al. | |
| 2002/0007230 A1 | 1/2002 | Ueno et al. | |
| 2002/0062999 A1 | 5/2002 | De-Noor et al. | |
| 2002/0118098 A1 | 8/2002 | Apneseth | |
| 2003/0183428 A1 | 10/2003 | Hedeen | |
| 2005/0023052 A1 | 2/2005 | Beck et al. | |
| 2005/0071048 A1 | 3/2005 | Watanabe et al. | |
| 2007/0193790 A1 | 8/2007 | Goldenberg et al. | |
| 2008/0011525 A1 * | 1/2008 | Kang et al. | 180/9.28 |
| 2008/0093131 A1 | 4/2008 | Couture | |
| 2008/0097376 A1 | 4/2008 | Hartmann et al. | |
| 2008/0143065 A1 | 6/2008 | DeFazio et al. | |
| 2008/0167752 A1 * | 7/2008 | Jacobsen | 700/250 |
| 2008/0179115 A1 | 7/2008 | Ohm et al. | |
| 2008/0183332 A1 | 7/2008 | Ohm et al. | |
| 2008/0184840 A1 | 8/2008 | Novoplanski et al. | |
| 2008/0223630 A1 | 9/2008 | Couture et al. | |
| 2008/0296853 A1 | 12/2008 | Langford et al. | |
| 2008/0316128 A1 | 12/2008 | Apostolos | |
| 2008/0316306 A1 | 12/2008 | Burkle et al. | |
| 2009/0314554 A1 | 12/2009 | Couture et al. | |
| 2010/0116566 A1 | 5/2010 | Ohm et al. | |
| 2010/0139995 A1 | 6/2010 | Rudakevych | |
| 2011/0180334 A1 | 7/2011 | Rudakevych | |
| 2011/0240382 A1 | 10/2011 | Gettings et al. | |
| 2011/0266076 A1 | 11/2011 | Morey et al. | |
| 2012/0097461 A1 | 4/2012 | Rudakevych | |
| 2012/0199407 A1 | 8/2012 | Morey et al. | |
| 2012/0261200 A1 | 10/2012 | Ohm et al. | |
| 2013/0256042 A1 | 10/2013 | Rudakevych | |
| 2014/0069731 A1 | 3/2014 | Ohm et al. | |
| 2014/0142753 A1 | 5/2014 | Ohm et al. | |
| 2014/0231156 A1 | 8/2014 | Rudakevych | |
| 2014/0305718 A1 | 10/2014 | Ohm et al. | |

FOREIGN PATENT DOCUMENTS

| | | |
|---|---|---|
| KR | 100861325 | 10/2008 |
| WO | WO-2008097376 A2 | 8/2008 |
| WO | 2012170081 | 12/2012 |

OTHER PUBLICATIONS

European Search Report for Application No. 14179187.1, dated Nov. 7, 2014.

International Preliminary Report on Patentability and Written Opinion for Application No. PCT/US2012/023043, dated Jul. 30, 2013.

* cited by examiner

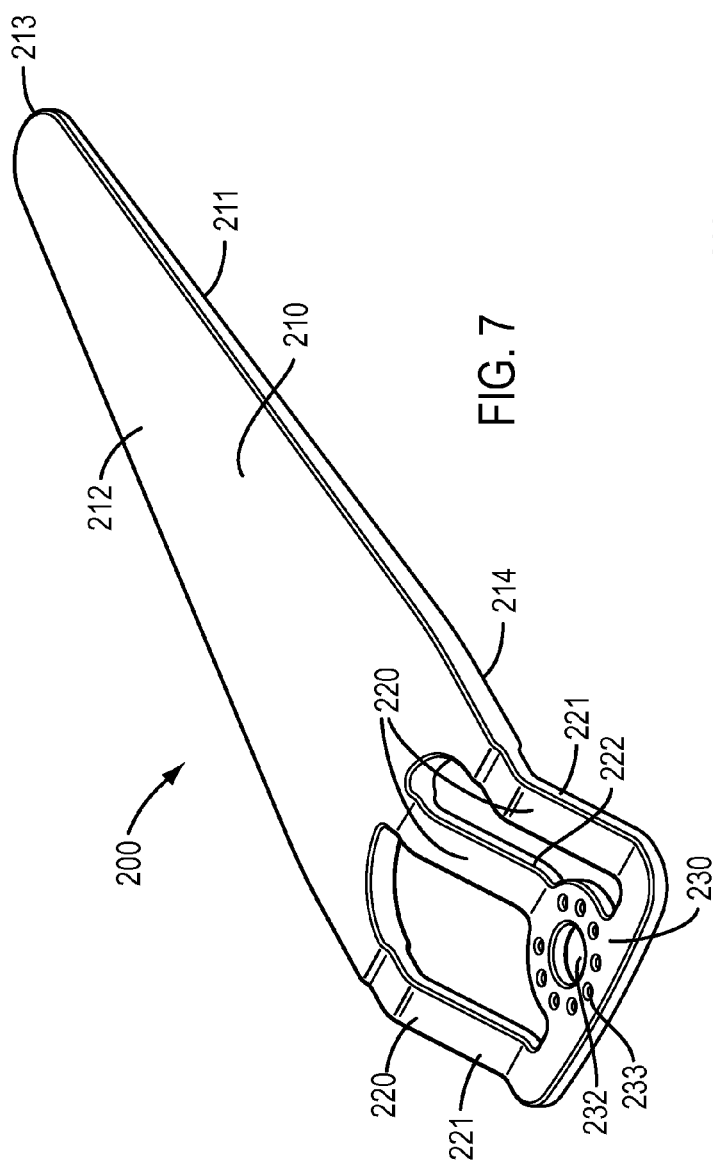
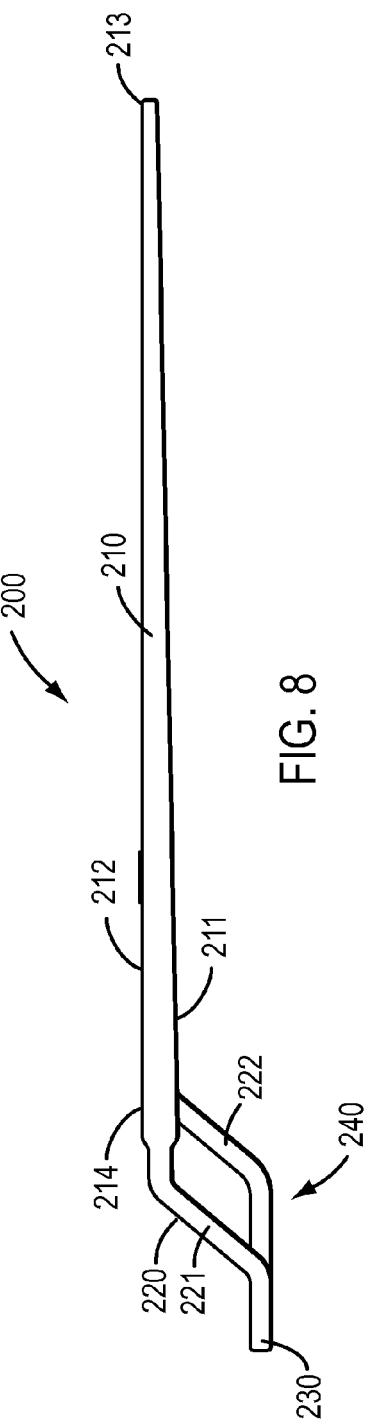
FIG. 7
FIG. 8

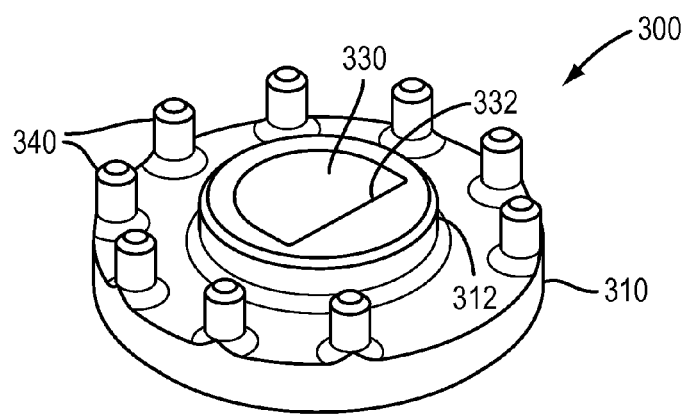
FIG. 11
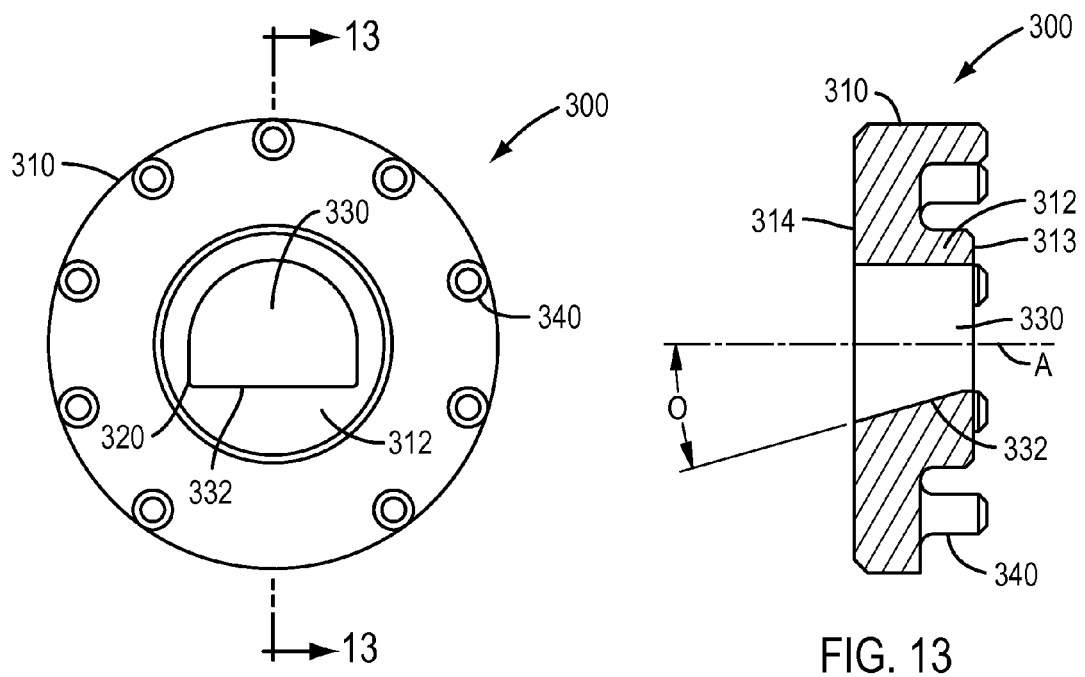
FIG. 12
FIG. 13

RESILIENT WHEEL ASSEMBLIES

This application claims the benefit of U.S. Provisional Patent Application No. 61/436,994, filed Jan. 27, 2011, the entirety of which is incorporated herein by reference.

FIELD

The present teachings relate generally to resilient wheel assemblies. More specifically, the present teachings relate to wheel assemblies, including wheel structures, flipper structures, and inserts, providing improved shock absorption for robotic applications.

BACKGROUND

The section headings used herein are for organizational purposes only and are not to be construed as limiting the subject matter described in any way.

When used in robotic applications, wheel assemblies may be required to withstand a significant amount of loading. A mobile robot, for example, may be thrown or dropped or may rollover or otherwise encounter impacts during its normal course of operation, thereby requiring that the robot have wheel structures that adequately absorb such forces (i.e., axial and/or radial loads) to prevent damage to the robot's wheels and/or chassis. To right the robot if the robot is upside down and/or on its side (e.g., after rolling or being dropped or thrown), a robot may require a resilient self-righting mechanism, such as, for example, a set of flipper arms coupled to its wheels, for example its rear wheels.

To improve the energy absorption of a wheel structure (i.e., to provide resilience for both radially-directed impacts and/or side (axially-directed) impacts), it may be desirable to provide a wheel structure that absorbs a predetermined amount of both axial and radial forces. Thus, it may be desirable to provide a wheel structure that allows a designer to tailor a wheel's axial and radial stiffness.

To prevent damage to a flipper structure during a side impact, it may be desirable to provide a flipper structure that can absorb side-impact energy and/or transmit side-impact energy to the wheel structure without compromising functionality. It may, therefore, be desirable to provide a flipper structure designed to absorb impact by translating toward the wheel structure during certain impacts, but which still provides adequate rotational stiffness to lift the robot or right an overturned robot. Furthermore, it may be desirable to provide an insert that creates a robust interface between an axle of the wheel and the flipper structure, thereby securely coupling the flipper structure to the axle while also preventing flipper backlash.

SUMMARY

The present teachings may solve one or more of the above-mentioned problems and/or achieve one or more of the above-mentioned desirable features. Other features and/or advantages may become apparent from the description which follows.

The present teachings provide a wheel structure for a vehicle. The wheel structure comprises a continuous, annular rim, a hub, and a plurality of spokes interconnecting the rim and the hub. The spokes comprise at least one slit extending therethrough radially inward from the rim to the hub. The spokes may be configured to absorb radial and axial forces. The at least one slit may be configured to reduce an axial stiffness of the spokes.

The present teachings additionally provide a method of molding a wheel structure. The wheel structure comprises a plurality of spokes interconnecting a rim and a hub. The spokes comprise at least one slit extending therethrough radially inward from the rim to the hub. The at least one slit forms a plurality of spoke layers within each spoke, the spoke layers being axially offset from one another around the hub.

The present teachings additionally provide a flipper structure for a vehicle. The flipper structure comprises an arm having a proximal end and a distal end; a plurality of legs coupled to the proximal end of the arm; and an attachment base coupled to the plurality of legs. The legs and attachment base comprise a four-bar linkage. The four-bar linkage may be configured to allow translation of the arm during impacts and provide rotational stiffness to the arm to lift the vehicle.

The present teachings additionally provide an insert for a flipper structure. The insert comprises an annular bushing configured to provide a robust interface between an axle and a flipper structure. The bushing comprises a bore with a flat surface that tapers outward from a top portion of the bushing to a bottom portion of the bushing. The flat surface may be configured to prevent backlash between the axle and the flipper structure.

The present teachings further provide a wheel assembly for a remote vehicle. The wheel assembly comprises a wheel structure comprising a plurality of spokes interconnecting a rim and a hub. The spokes comprise at least one slit extending therethrough radially inward from the rim to the hub. The wheel assembly also comprises a flipper structure comprising an arm, a plurality of legs, and an attachment base. The plurality of legs and the attachment base comprise a four-bar linkage. The wheel assembly further comprises an insert comprising a bore with a flat surface that tapers outward from a top portion of the insert to a bottom portion of the insert. The insert may be configured to couple the flipper structure to the wheel structure via an axle on the remote vehicle and prevent backlash between the axle and the flipper structure. The flipper structure may be configured to transmit axial forces to the wheel structure. The wheel structure may be configured to absorb radial and axial forces.

Additional objects and advantages of the present teachings will be set forth in part in the description which follows, and in part will be obvious from the description, or may be learned by practice of the present teachings. The objects and advantages of the present teachings can be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain the principles of those teachings.

BRIEF DESCRIPTION OF THE DRAWINGS

FIG. 7 is a perspective view of an exemplary embodiment of a flipper structure in accordance with the present teachings;

FIG. 8 is a side view of the flipper structure of FIG. 7;

FIG. 11 is a perspective view of an exemplary embodiment of an insert in accordance with the present teachings;

FIG. 12 is a top view of the insert of FIG. 11;

FIG. 13 is a cross-sectional view of the insert of FIG. 12, taken through line 13-13 in FIG. 12;

DESCRIPTION

Figure 1:
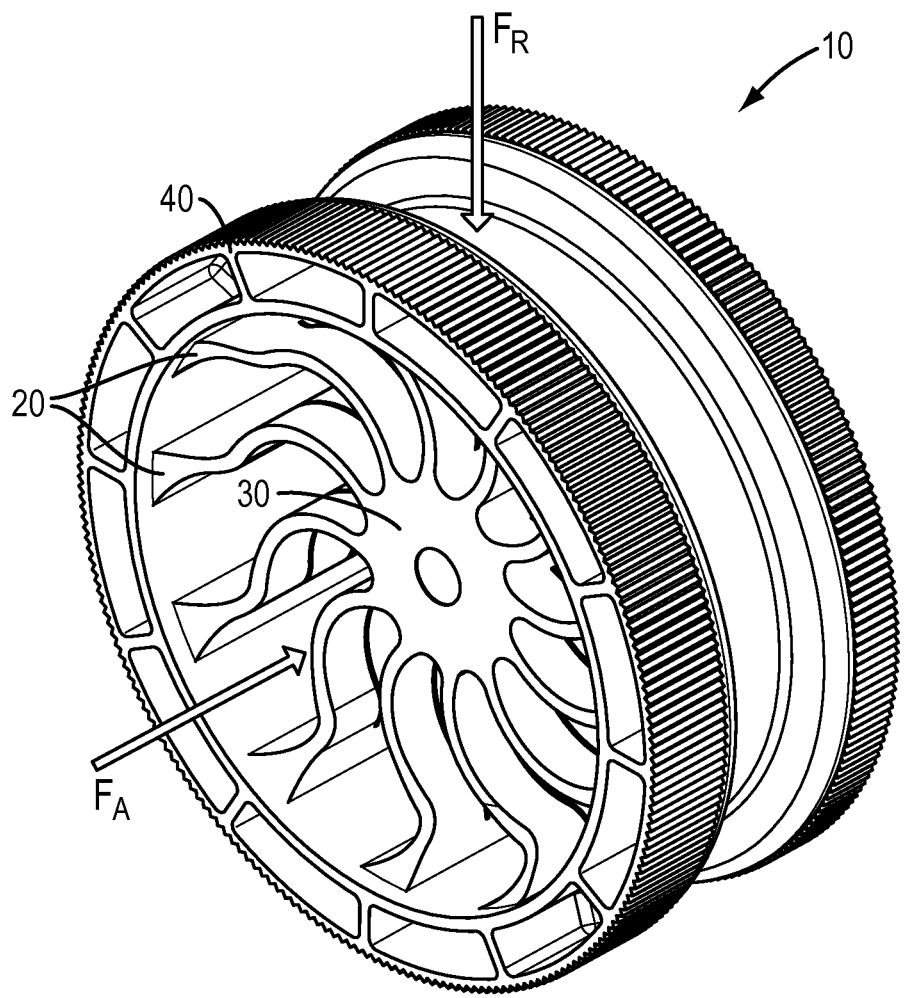
FIG. 1 is a perspective view of an exemplary embodiment of a wheel structure in accordance with the present teachings.

Reference will now be made in detail to exemplary embodiments of the present teachings, examples of which are illustrated in the accompanying drawings.

The present teachings relate to resilient wheel assemblies, such as, for example, wheel structures, flipper structures, and inserts, which can improve the shock absorption of a remote vehicle, such as, for example, a small unmanned ground vehicle (SUGV), including, for example, an iRobot® ThrowBot-type SUGV that is man-portable and throwable. A wheel structure that absorbs both radial and axial forces can be achieved in accordance with the present teachings by utilizing a plurality of spokes comprising at least one slit, wherein the at least one slit extends radially inward from a rim of the wheel (or a radially outer position of the spoke) to a hub of the wheel (or a radially inner position of the spoke). Slits in accordance with the present teachings may, for example, effectively reduce the axial stiffness of the spokes, thereby increasing the resilience of the wheel structure against axial loads (i.e., side impacts) when the vehicle is dropped and/or thrown. In accordance with certain embodiments of the present teachings, the increased resilience of the wheel in the axial direction does not negatively affect its ability to withstand loads in the radial direction.

Furthermore, a flipper structure that absorbs side impact energy and/or transmits side-impact energy (i.e., axial shock) to the wheel structure can be achieved in accordance with the present teachings by utilizing a low profile flipper arm having a plurality of legs, wherein the plurality of legs (in conjunction with an attachment base) effectively form a four-bar linkage between the flipper arm and the wheel structure. The four-bar linkage may, for example, allow translation of the flipper arm during a side impact (i.e., allowing the arm to safely collapse into the wheel structure), while still providing adequate rotational stiffness for the flipper to lift and manipulate the remote vehicle during normal remote vehicle operation.

As used herein, the terms "radial force" or "radial load" refer to a force that exits perpendicular to a wheel's axis of rotation. In other words, a radial force is a force directed radially along the surface of a wheel structure 10 as illustrated, for example, by arrow $F_R$ in FIG. 1. As used herein the term "radial shock," therefore, refers to a radial impact force directed along the surface of the wheel structure as illustrated by $F_R$, which can be caused, for example, by a top and/or bottom impact to the wheel structure.

As used herein, the terms "axial force" or "axial load" refer to a force that exists parallel to a wheel's axis of rotation. In other words, an axial force is a force directed along the longitudinal axis of the wheel structure 10 as illustrated, for example, by arrow $F_A$ in FIG. 1. As used herein, the term "axial shock," therefore, refers to a an axial impact force directed along the longitudinal axis of the wheel structure as illustrated by $F_R$, which can be caused, for example, by a side impact to the wheel structure and/or flipper structure.

As used herein, the term "low profile" refers to a design and position characterized by a deliberate avoidance of prominence on a vehicle.

In various exemplary embodiments, wheel assemblies in accordance with the present teachings may be attached to and/or mounted on mobile robots, such as, for example, an axle of a robotic vehicle such as an iRobot® ThrowBot-type SUGV as illustrated, for example, in FIGS. 14-18. Those of ordinary skill in the art would understand, however, that the wheel assemblies of the present teachings, including, for example, the wheel structures, flipper structures, and inserts of the present teachings, are useful in various applications, improving shock absorption for various vehicles, and are not intended to be limited in any way by the exemplary embodiments discussed above and below with regard to robotic systems.

Resilient Wheel Structures

Figure 2:
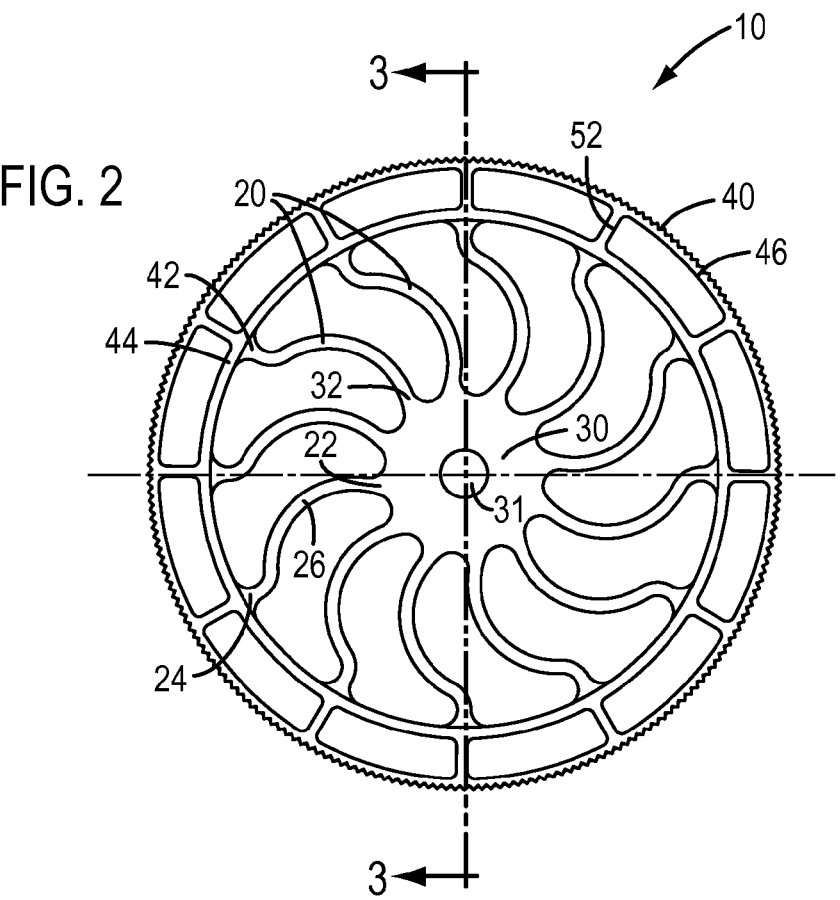
FIG. 2 is a side view of the wheel structure of FIG. 1.
Figure 3:
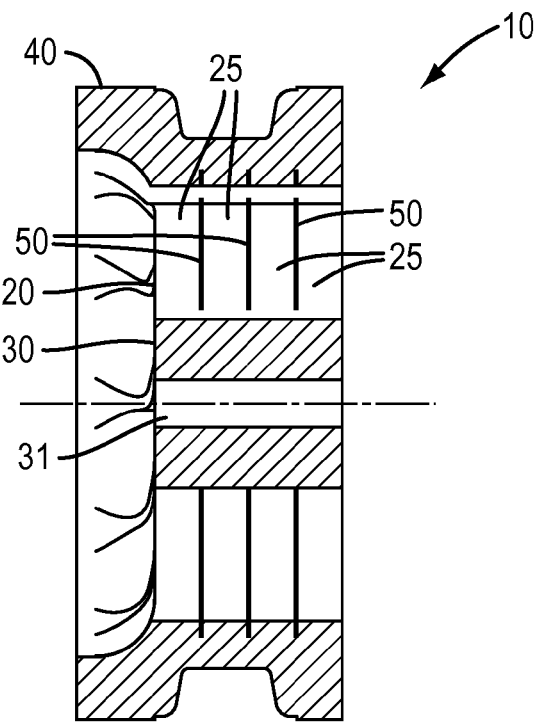
FIG. 3 is a cross-sectional view of the wheel structure of FIG. 2, taken through line 3-3 in FIG. 2.

With reference now to FIGS. 1-3, perspective, side, and cross-sectional views of an exemplary embodiment of a wheel structure 10 are shown. The wheel structure 10 comprises a continuous, annular rim 40, a hub 30, and a plurality of spokes 20 interconnecting the rim 40 and the hub 30.

The rim 40 is designed for maximum rigidity, allowing the force from any radial impact or load to be distributed to the maximum number of spokes 20. In various embodiments, for example, the distributive effects of the rim 40 are accomplished by incorporating an inner rim 44, an outer rim 46, and one or more ribs 52 connecting the inner rim 44 and the outer rim 46 as illustrated in FIG. 2. The rim 40, the ribs 52, and the relationship between the inner rim 44 and the outer rim 46 are discussed in detail, for example, in U.S. Pat. No. 6,615,885 B1 (filed Oct. 29, 2001; entitled "Resilient Wheel Structure"), the entire contents of which are incorporated by reference herein.

Figure 16:
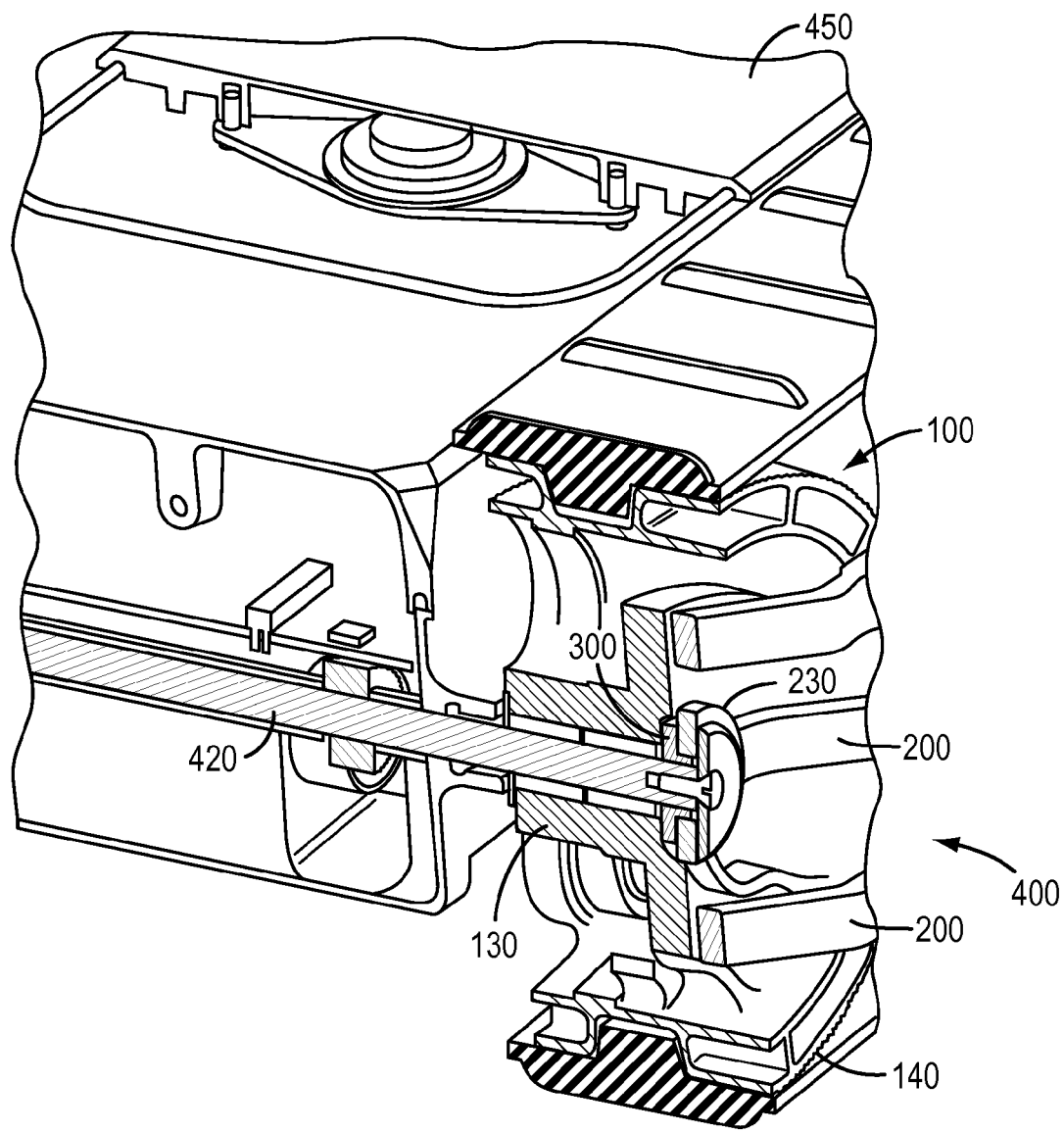
FIG. 16 is a partial cross-sectional view of the wheel assembly of FIG. 15, taken through line 16-16 in FIG. 15.
Figure 17:
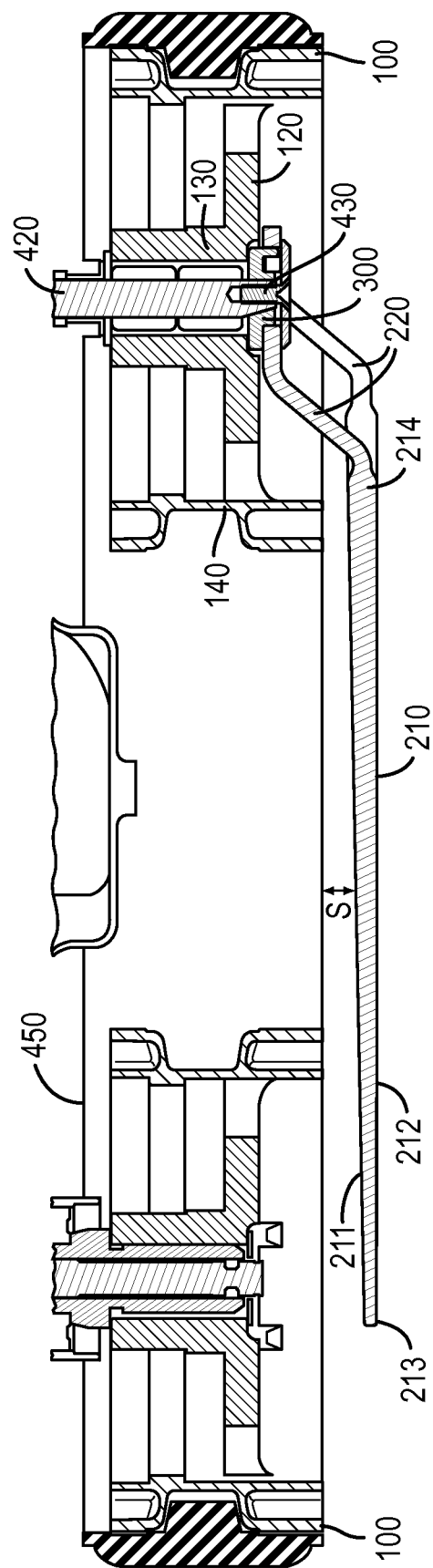
FIG. 17 is a cross-sectional view of the wheel assembly of FIG. 14, taken through line 17-17 in FIG. 14.
Figure 18:
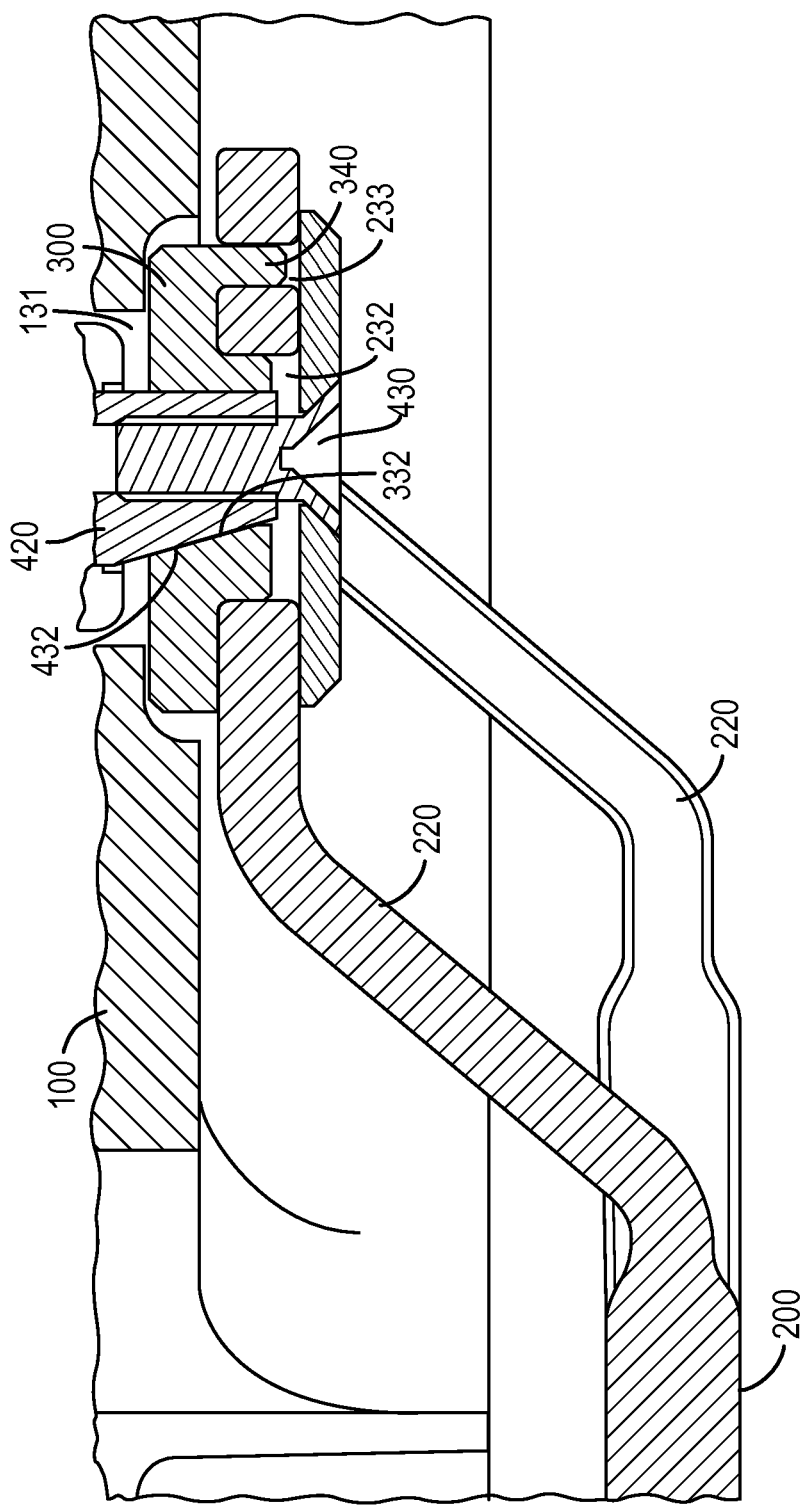
FIG. 18 is an enlarged cross-sectional view of the flipper structure and insert of FIG. 17.

The hub 30 is configured, for example, to attach the wheel structure 10 to an axle of a remote vehicle (See FIGS. 16-18). Thus, as shown in FIGS. 2 and 3, the hub 30 may comprise a bore 31 for receiving the axle as described below.

The spokes 20 are equispaced around the wheel structure 10, each spoke 20 extending from a rim origin point 42 at the inner rim 44 to a hub origin point 32 at the hub 30. As shown in FIGS. 1 and 2, for example, in various embodiments, there are approximately twelve spokes 20 spaced around the wheel 10. Those of ordinary skill in the art would understand, however, that the embodiment shown and described with reference to FIGS. 1 and 2 is exemplary only, and that the number and configuration of spokes 20 used on the wheel structure 10 may be chosen based on the design criteria for a specific application as discussed below.

As shown in FIG. 2, each spoke 20 can have three spoke portions, a first spoke portion 22, a second spoke portion 24, and a third spoke portion 26, each with a different curvature. The first spoke portion 22 is connected to the hub 30 at the hub origin point 32. The second spoke portion 24 is connected to the inner rim 44. The third spoke portion 26 connects the first spoke portion 22 to the second spoke portion 24.

In accordance with various embodiments of the present teachings, the third spoke portion 26 is generally shaped, for example, to eliminate inflection points, thereby providing zero stress transitions from tension to compression along the surface of each spoke 20. The spokes 20 may, therefore, absorb energy from radial shocks to the wheel structure 10 (i.e., deflect in a radial direction) by deforming in three axes as would be understood by those of ordinary skill in the art.

Although in the exemplary embodiment of FIG. 2 the spokes 20 are depicted as being identical (i.e., the length and curvature of each spoke portion 22, 24, and 26 is identical for each spoke 20), with a uniform thickness and a substantially rectangular cross section, those of ordinary skill in the art would understand that the spokes 20 may have various curvature profiles, dimensions, and/or cross-sectional shapes, with various configurations of spoke portions 22, 24, and 26, without departing from the scope of the present teachings. The spokes 20 and the spoke portions 22, 24 and 26 are discussed in greater detail, for example, in U.S. Pat. No. 6,615,885 B1.

Each spoke 20 has at least one slit extending radially inward from the rim 40 to the hub 30. As shown in FIG. 3, for example, in various embodiments, each spoke 20 has three slits 50 extending radially inward from the rim 40 to the hub 30, creating four spoke layers 25 spaced axially within each spoke 20. As would be understood by those of ordinary skill in the art, the slits 50 reduce the axial stiffness of the spokes 20. The spokes 20 may, therefore, absorb energy from axial shocks to the wheel structure 10 by deflecting in the axial direction.

The present teachings, therefore, provide a wheel structure 10, which allows a designer to tailor a wheel's axial and radial stiffness using at least slits 50 and the number and configuration of the spokes 20, respectively. As would be understood by those of ordinary skill in the art, for example, the number of spokes 20 and slits 50 used on the wheel structure 10 may be chosen based on the design criteria for a specific application. One of skill in the art would be able to determine, for example, the volume of material needed (e.g., the number and size of spokes 20 needed) to actively absorb a given amount of radial force, and the number and size of slits 50 needed (i.e., the greater the number of slits 50, the greater the reduction in axial stiffness of the spokes 20) to actively absorb a given amount of axial force, based on such variables as the material (s) used for the wheel structure 10.

In various exemplary embodiments, for example, the wheel structure 10 may be machined from a high resiliency material such as an impact-resistant polymer. Since the mass of the wheel structure 10 contributes to the energy that must be absorbed during an impact event, lightweight materials such as polymers can be used, for example, to reduce the mass of the wheel structure 10. Those of ordinary skill in the art would understand, however, that the wheel 10 may be formed from various resilient materials including, for example, resilient composites, and certain high strength metals, such as, for example, spring steel, and that the material used for the wheel structure 10 may be chosen as desired based on intended applications, strength/weight considerations, cost, and other design factors.

Furthermore, those of ordinary skill in the art would understand that wheel structures in accordance with the present teachings may be formed using various methods and/or processes. Various embodiments of the present teachings, for example, contemplate a method of manufacturing a wheel structure that comprises molding the wheel structure, such as, for example, through a conventional injection molding process.

Figure 4:
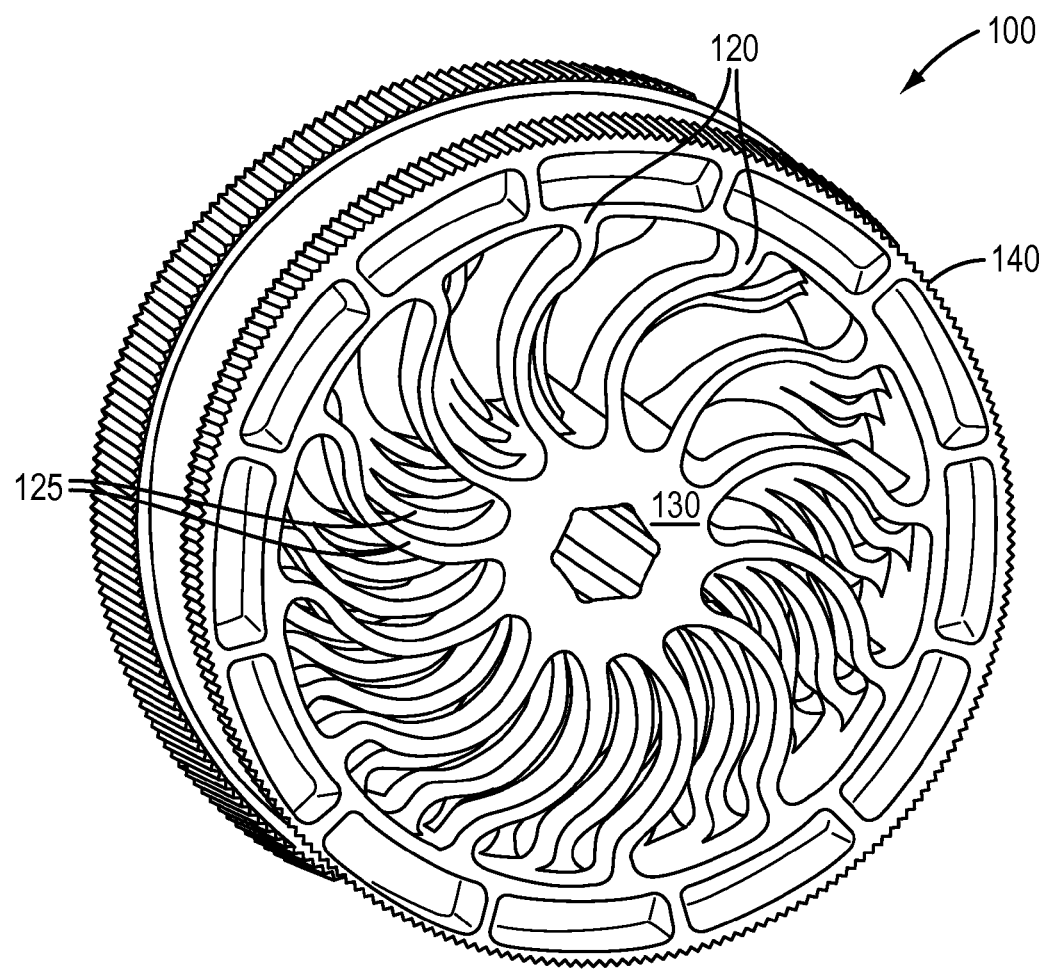
FIG. 4 is a perspective view of another exemplary embodiment of a wheel structure in accordance with the present teachings.
Figure 5:
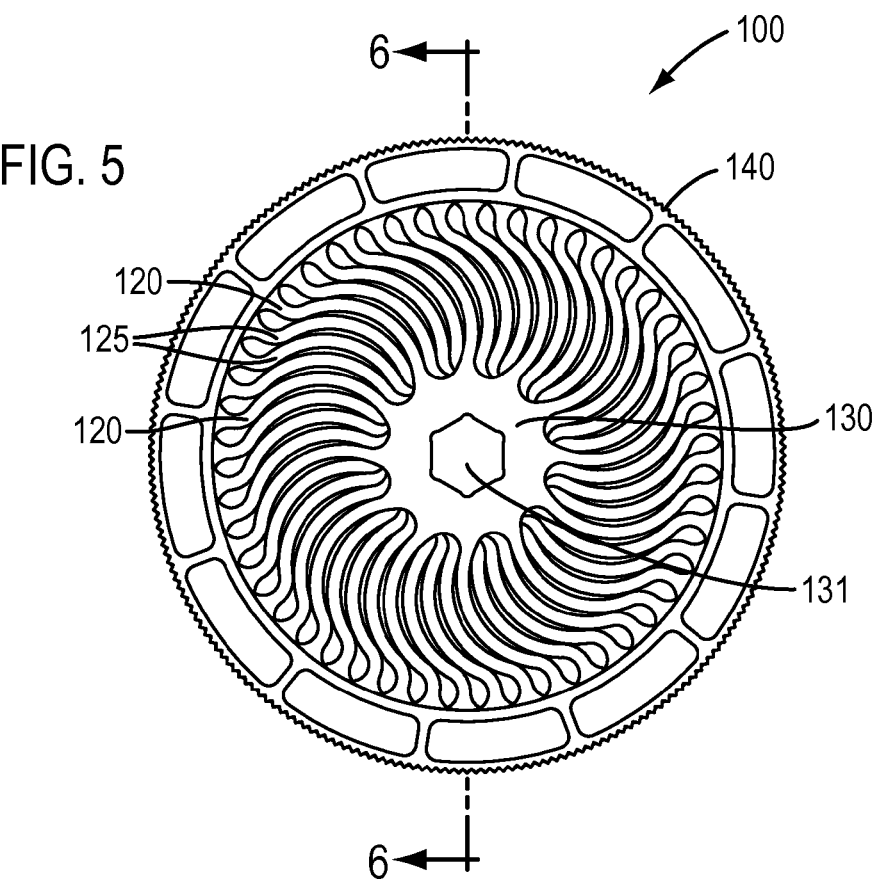
FIG. 5 is a side view of the wheel structure of FIG. 4.
Figure 6:
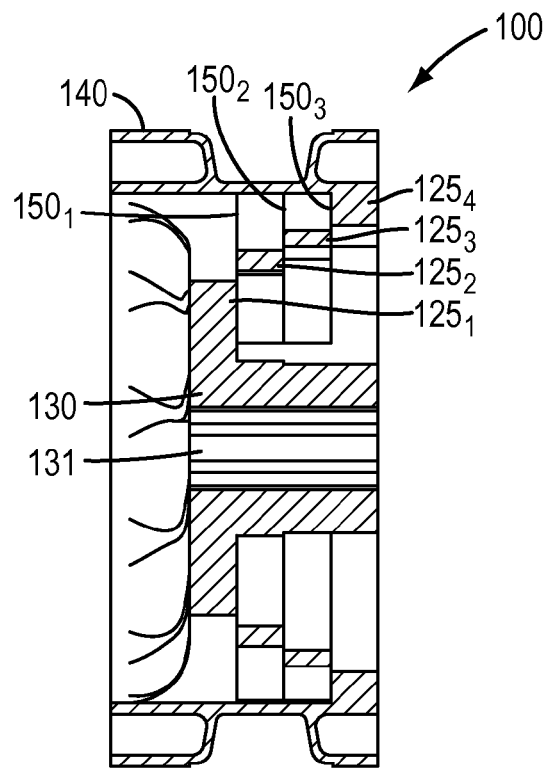
FIG. 6 is a cross-sectional view of the wheel structure of FIG. 5, taken through line 6-6 in FIG. 5.

FIGS. 4-6 illustrate an exemplary moldable embodiment of a wheel structure 100, wherein the spoke layers (similar to the layers 25 shown in FIG. 3) of each spoke are splayed apart from one another circumferentially. As above, the wheel structure 100 comprises a continuous, annular rim 140, a hub 130, and a plurality of spokes 120 interconnecting the rim 140 and the hub 130. Each spoke 120 has at least one slit extending radially inwardly from the rim 140 to the hub 130, creating a plurality of spoke layers 125 within each spoke 120. As illustrated in FIG. 6, for example, in various embodiments, each spoke 120 has three slits 150 ($150_1$-$150_3$), creating four spoke layers 125 ($125_1$-$125_4$) within each spoke 120. To mold the wheel structure 100, the spoke layers 125 may, for example, be radially offset from one another around the hub 130 as best illustrated in FIG. 4. Such a configuration may, for example, permit a wheel structure 100 with multiple spoke layers 125 to be removed from a mold (i.e. unmolded), as would be understood by those ordinarily skilled in the art.

In various embodiments, the wheel structure 100 may be molded, for example, from a polycarbonate resin, such as Lexan EXL1414. Those of ordinary skill in the art would understand, however, that the wheel structure 100 may be formed from various moldable materials including, for example, various polyamide resins, such as, for example, Zytel® ST801 and Grilamid XE3910 E, and that the material used for the wheel structure 100 may be chosen as desired based on intended application(s), strength/weight considerations, cost, and other design factors.

Resilient Flipper Structures

With reference now to FIGS. 7 and 8, an exemplary embodiment of a flipper structure 200 for use in conjunction with a wheel structure (e.g., a wheel structure 10 and/or 100) of the present teachings is shown. Use of the wheel structure 100 and flipper structure 200 together in a remote vehicle is illustrated in FIGS. 14-18. The flipper structure 200 is designed, for example, to improve the mobility of a robotic vehicle, as described, for example, in U.S. Patent Publication No. 2010/0139995 A1 (filed Dec. 9, 2008; entitled "Mobile Robotic Vehicle"), the entire contents of which are incorporated by reference herein.

Figure 15:
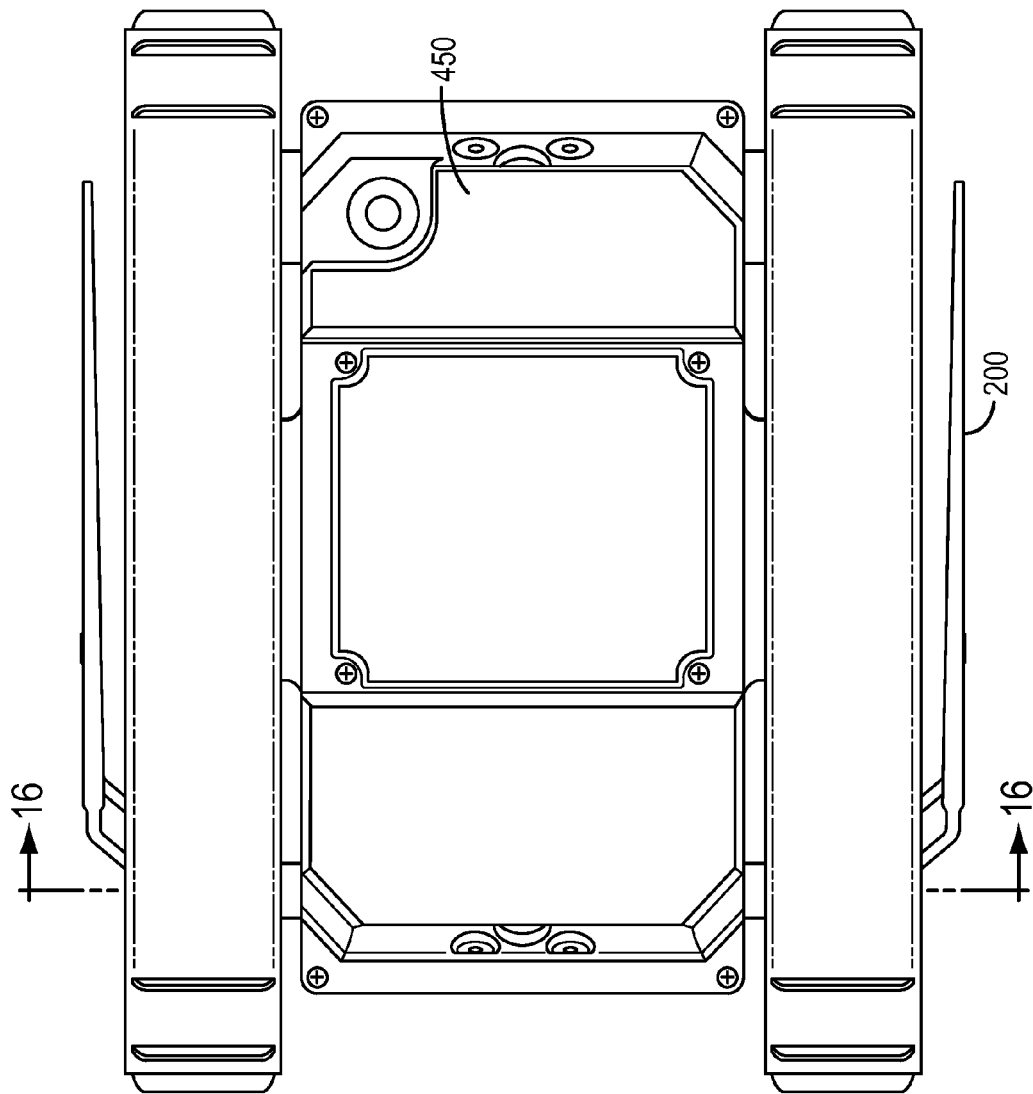
FIG. 15 is a top view of the mobile robot of FIG. 14 showing a portion of a wheel assembly.

The flipper structure 200 may comprise, for example, an arm 210, a plurality of legs 220, and an attachment base 230. As shown in FIGS. 15 and 17, for example, when the flipper structure 200 is attached to a remote vehicle, such as, for example, a remote vehicle 450, the arm 210 may extend longitudinally along the side of the remote vehicle 450, and as described below prevent the wheel structures 100 from twisting during impact due to forces exerted on the wheel by an impacted flipper. Due to the four-bar linkage of the flipper, side-impact forces on the flipper will be directed axially into the wheel rather than twisting the wheel in a case where the side impact force causes the flipper to rotate about its base. The four-bar linkage created by the legs 220 allows an outer surface of the flipper 200 to remain substantially parallel to the robot even when the flipper 200 deflects in response to a side-impact force, and allows force translated by the flipper to the wheel to be substantially axially directed rather than torsional.

The arm 210 comprises an inner surface 211 and an outer surface 212 wherein, as shown in FIGS. 15 and 17, the inner surface 211 is generally positioned adjacent to the wheel structures. As illustrated in FIG. 8, for example, in various embodiments, the inner surface 211 can taper inwardly (making the arm thinner) as the arm 210 extends from the legs 220 of the flipper 200 to its distal end 213. The distal end 213 of the arm 210 can therefore be thinner than a proximal end 214 of the arm 210, such that the arm 210 is thickest at the proximate end 214 (where it is supported) and gets thinner towards the distal end 213. This configuration may, for example, decrease the arm's weight without compromising the arm's overall strength and stiffness.

Thus, when the flipper structure 200 is attached to a remote vehicle (e.g., the remote vehicle 450 illustrated in FIGS. 15 and 17), in various exemplary embodiments, the inner surface 211 of the arm 210 slants away from the remote vehicle 450 to form a space S (see FIG. 17) between the arm 210 and the remote vehicle 450, while the outer surface 212 of the arm 210 remains parallel to the remote vehicle 450. As would be understood by those of ordinary skill in the art, the space S may be sized accordingly to, for example, (1) prevent the distal end 213 of the arm 210 from rubbing against the front wheel structure 100 (or another structure of the remote vehicle) if the arm 210 gets deformed, (2) prevent the distal end 213 of the arm 210 from getting caught in the front wheel structure 100 (or another structure of the remote vehicle) when the remote vehicle 450 is on its side, (3) prevent debris (e.g., grass, gravel, twigs, etc.) from getting lodged between the arm 210 and the remote vehicle 450, and (4) prevent the distal end 213 from catching on external objects.

The legs 220 couple the arm 210 to the attachment base 230. As shown in FIGS. 7 and 8, in various exemplary embodiments, the flipper structure 200 can have three legs 220 (two outer legs 221 and one inner leg 222). As best illustrated in FIG. 8, the legs 220 and attachment base 230 form a four-bar linkage 240, wherein the attachment base 230 is the fixed link, as would be understood by those of ordinary skill in the art. Thus, when the flipper structure 200 is attached to a remote vehicle 450 as illustrated in FIGS. 14-18, the arm 210 may translate into the remote vehicle 450 (i.e., into the wheel structure 100) during a side impact (i.e., an axial shock), without the arm bending toward the remote vehicle such that its distal end catches on a front wheel structure (i.e., the arm remains substantially parallel to the remote vehicle), and while still providing adequate rotational stiffness to lift and maneuver the vehicle in accordance with the teachings of U.S. Patent Publication No. 2010/0139995. The four-bar linkage 240 can prevent damage to the flipper structure 200 during side impacts by transferring axial force to a wheel structure (where the force may be absorbed as described above).

As would be understood by those of ordinary skill in the art, the size and configuration of the flipper structure 200 may be chosen based on the design criteria for a specific application and remote vehicle. One of skill in the art would be able to determine, for example, the dimensions and configuration of legs 220 needed for adequate translation of side impact forces, and the length and thickness of arm 210 needed for adequate rotational stiffness to lift and right the remote vehicle, based for example on the size and weight of the remote vehicle and the materials used for the flipper structure 200.

Figure 9A:
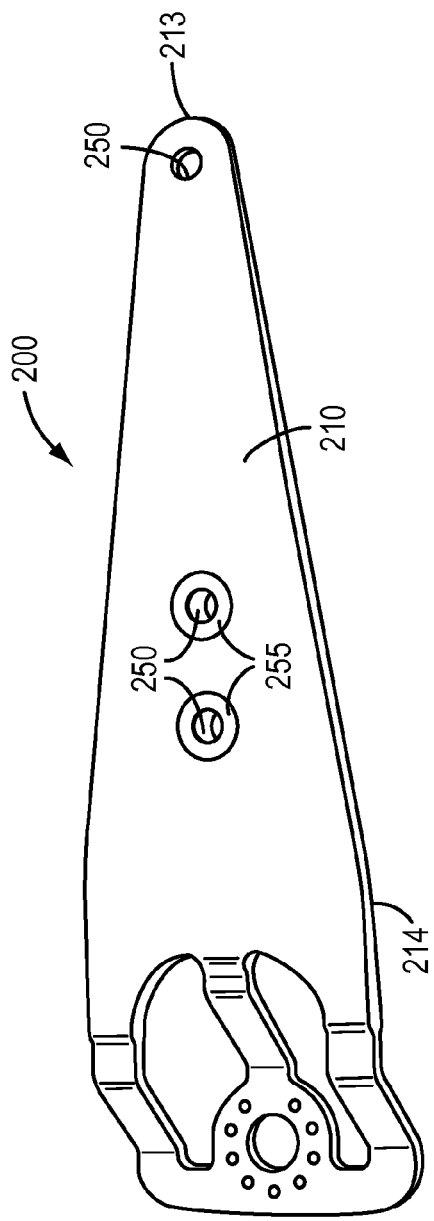
FIGS. 9A and 9B are respectively top and bottom views in perspective of another exemplary embodiment of a flipper structure in accordance with the present teachings.
Figure 9B:
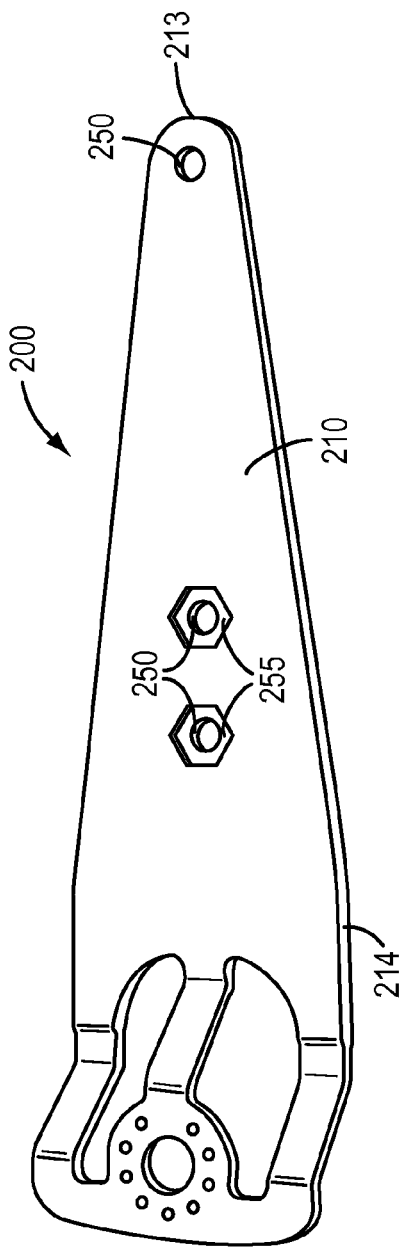

With reference to FIGS. 9A and 9B, for example, in various embodiments of the present teachings, the flipper structure 200 may include holes for mounting objects and/or payloads. As shown in FIGS. 9A and 9B, for example, in various embodiments the flipper structure 200 may include three holes 250 positioned along a longitudinal axis of the flipper structure 200 between the proximal end 214 and the distal end 213 of the arm 210. To prevent stress concentrations around the holes 250, in various embodiments, a reinforcement material 255 may be added around the holes 250. As would be understood by those of ordinary skill in the art, the number, size and configuration of the holes 250 and/or reinforcement material 255 may be chosen based on the design criteria for a specific application and remote vehicle.

Figure 10A:
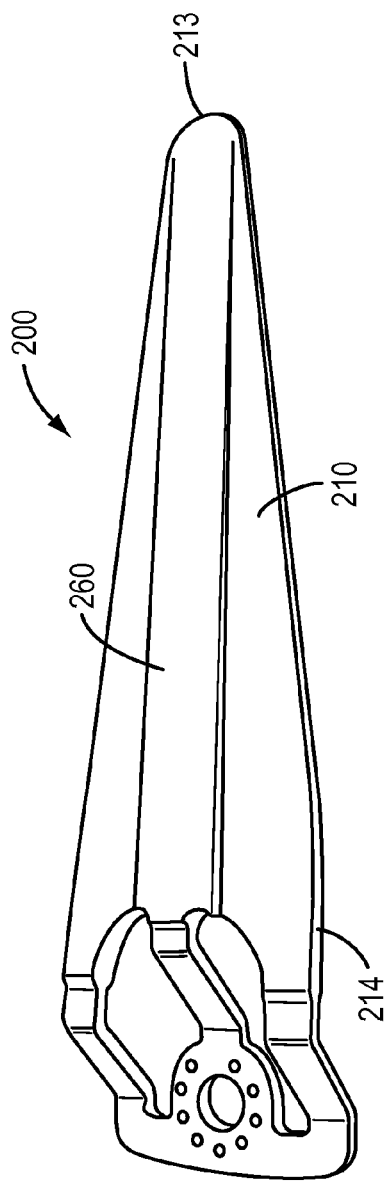
FIGS. 10A and 10B are respectively top and bottom views in perspective of another exemplary embodiment of a flipper structure in accordance with the present teachings.
Figure 10B:
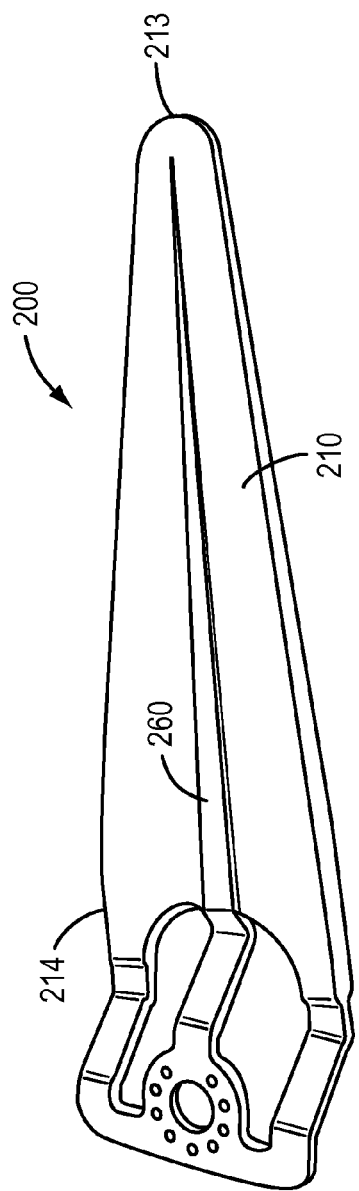

With reference to FIGS. 10A and 10B, in various additional embodiments of the present teachings, the flipper structure 200 may include a V-shaped cross section to increase the rigidity of the flipper arm 210 (i.e., to make the flipper arm 210 more rigid to bending, for example, away from the remote vehicle 450). As shown in FIGS. 10A and 10B, for example, in various embodiments the flipper structure 200 may include a V-shaped cross section 260 that extends along the longitudinal axis of the flipper structure 200 between the proximal end 214 and the distal end 213 of the arm 210. The orientation of the V-shaped cross-section 260, for example, further lends itself to pushing grass and other debris away from the wheel structures 100 (e.g., where the grass and/or debris is likely to get caught between the tracks and the wheels and inhibit the vehicle's mobility).

As would be understood by those of ordinary skill in the art, upon impact, the V-shaped cross-section 260 may bend toward a flat cross section (i.e., be crushed flat) such that it maximizes load distribution into, for example, the rim 40 of the wheel structure 100 (i.e. similar to a flipper with a flat cross-section). After impact, the V-shaped cross-section may then return to its original V shape, and once again increase the rigidity of the flipper arm. The rigidity of the flipper arm 210 may also be increased by increasing the thickness of the flipper arm as would be understood by those of ordinary skill in the art. Merely increasing the thickness of the flipper arm may, however, compromise load distribution into the rim 40 (i.e., such that the load is not uniformly distributed into the rim upon impact), which may not only cause the wheel structure 100 to bend at an angle, but may also create higher stresses on the flipper structure 200, thereby causing permanent deformation of the flipper body 210.

In various embodiments, the flipper structure 200 may be molded, for example, from a polyamide resin, such as Zytel® ST801, manufactured by Dupont™. Those of ordinary skill in the art would understand, however, that the flipper structure 200 may be formed using various methods and/or techniques, using various materials including, for example, various ductile plastics, resins, and metals, and that the material used for the flipper structure 200 may be chosen as desired based on intended application(s), strength/weight considerations, cost, and other design factors.

The attachment base 230 is configured, for example, to attach the flipper structure 200 to an axle of a remote vehicle via an insert 300 (See FIGS. 16-18). The axle can drive (i.e., rotate) the flipper. As shown in FIG. 7, the attachment base 230 may comprise a plurality of insert holes 233 and a bore 232 for receiving an insert and a fastener, respectively. In various embodiments, for example, nine insert holes 233 may be spaced evenly around an outer surface of the attachment base 230 to receive insert pins as described below. In various additional embodiments, a fastener (e.g., a mounting bolt 430) (see FIG. 18) may pass through the bore 232 to secure the flipper structure 200 to the axle.

Inserts

With reference now to FIGS. 11-13, an exemplary embodiment of an insert 300 for use in conjunction with a flipper structure (e.g., a flipper structure 200) of the present teachings is shown. As shown in FIGS. 16-18, for example, when the insert 300 is engaged with an axle 420 of a remote vehicle, such as, for example, a remote vehicle 450, the insert 300 may provide a robust interface between the axle 420 and the flipper structure 200.

The insert may comprise, for example, an annular bushing 310 with a flange 312. As illustrated in FIG. 13, the flange 312 has a bore 330 with a flat offset surface 332 that tapers outward from a top portion 313 of the bushing 310 to a bottom portion 314 of the bushing 310 to create an offset angle O. In various embodiments of the present teachings, for example, the offset angle O is at least about 15 degrees from an axis A of the insert 300, such as, for example, about 16 degrees from the axis A. Thus, to mount the insert 300 on an axle 420 as illustrated in FIGS. 17 and 18, the flat offset surface 332 can mate with a corresponding offset surface 432 (i.e., having a complementary offset angle O) of the axle 420.

In various embodiments, the insert 300 may also comprise a plurality of pins for mounting the flipper structure 200 to the axel 420 (See FIG. 18). As shown in FIGS. 11-13, for example, the insert 300 may comprise nine pins 340 configured to respectively engage the nine insert holes 233 of the flipper structure 200, thereby transmitting torque between the axle 420, which drives (rotates) the insert 300, and the flipper structure 200. Those of ordinary skill in the art would understand, however, that the embodiments of FIG. 7 (i.e., flipper structure 200) and FIGS. 11-13 (i.e., insert 300) are exemplary only, and that flipper structures and inserts in accordance with the present teachings may respectively comprise various types, sizes, numbers and/or configurations of insert holes 233 and pins 340 without departing from the scope of the present teachings.

When the flipper structure 200 and the insert 300 are tightened to the axle 420, the insert 300 can provide a zero-backlash interface (e.g., the insert 300 can wedge the flipper 200 against the axle 420 via the offset surface 332 to prevent backlash between the parts. As used herein, the term "backlash" refers to play resulting from loose connections between mechanical elements. In other words, backlash is the play resulting from a loose connection between the axle and the insert and/or between the insert and the flipper structure. The offset surface 332 can transmit torque while preventing any loose connection and therefore backlash between the axle 420 and the insert 300 that may otherwise exist, for example due to manufacturing tolerances or the need to provide clearance to allow parts to mate.

In various embodiments, the insert 300 may be formed, for example, from stainless steel, such as a grade 303 stainless steel. Those of ordinary skill in the art would understand, however, that the insert 300 may be formed from various high-strength materials that can be chosen based on intended application(s), strength considerations, corrosion resistance, cost, and other design factors.

Resilient Wheel Assemblies

With reference now to FIGS. 14-18, in various exemplary embodiments, a wheel structure 100, flipper structure 200, and insert 300 may be assembled on a remote vehicle 450. A wheel assembly 400 comprising the wheel structure 100, flipper structure 200, and insert 300 may be constructed, for example, on an axle 420 of the remote vehicle 450.

Figure 14:
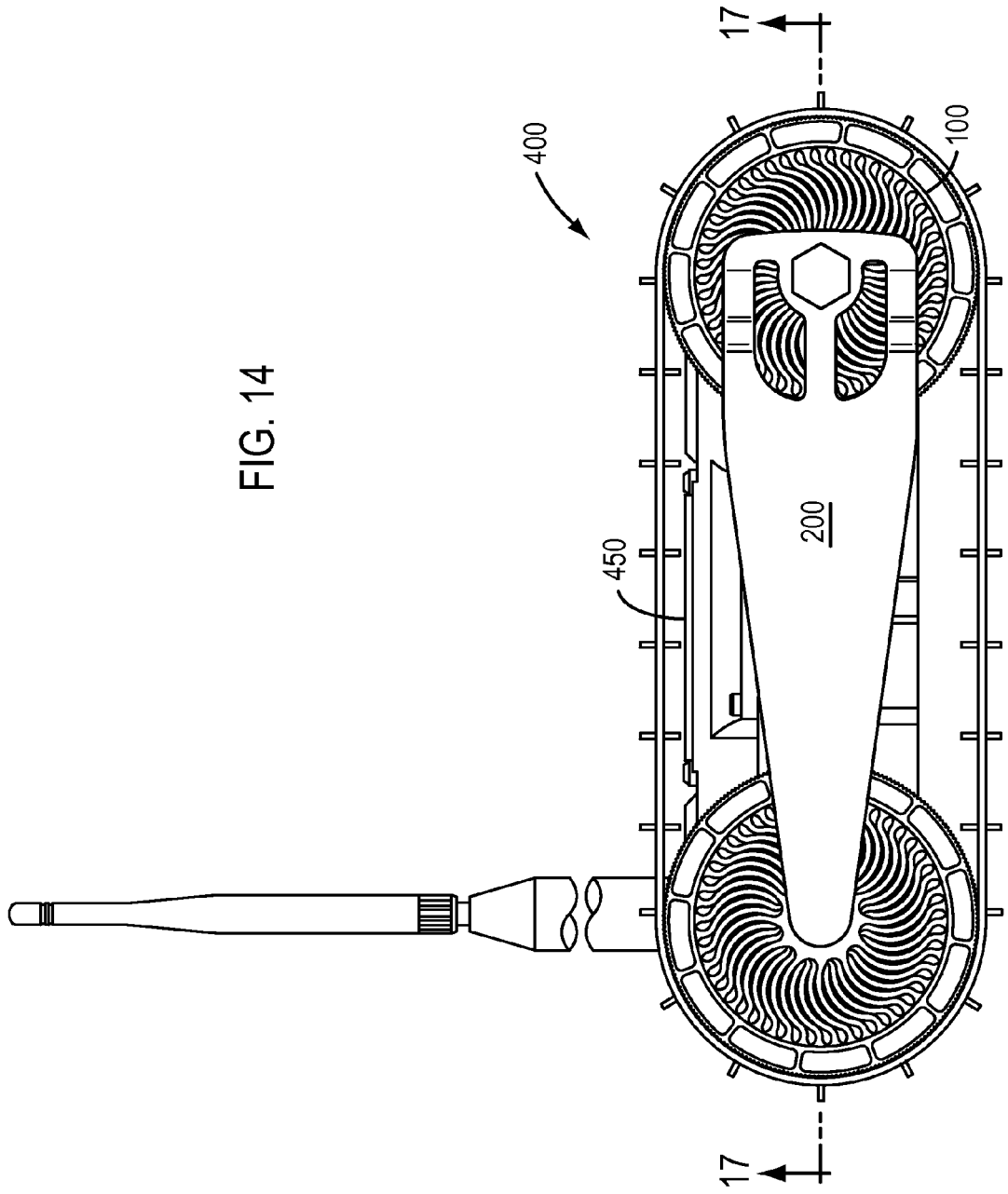
FIG. 14 is a side view of a wheel assembly mounted on a mobile robot in accordance with the present teachings.

As shown in FIGS. 14-16, the wheel structure 100 may be mounted on the axle 420 via the hub 130 of the wheel structure 100, wherein the axle 420 extends longitudinally through a bore 131 (See FIGS. 5 and 6) in the hub 130 to drive the wheel structure 100 and also to engage the insert 300. As above, the axle 420 may comprise an offset surface 432, which complements the offset surface 332 in the insert 300. Thus, the insert 300 may be securely mated with the axle 420. The flipper structure 200 may then be mounted to the axle 420 via the insert 300. As above, the insert 300 may comprise a plurality of pins 340, which may engage a plurality of insert holes 233 in the flipper structure 200. The wheel structure 100, insert 300, and flipper structure 200 may then all be secured to the axle 420 via a fastener 430, wherein the fastener 430 extends longitudinally through the bore 232 in the flipper structure 200 to engage the axle 420 as illustrated in FIG. 18.

Those of ordinary skill in the art would understand that various types, sizes, numbers, and/or configurations of bores and/or fasteners can be used without departing from the scope of the present teachings. Those of ordinary skill in the art would further understand that the wheel structure, insert, and flipper structure may be secured to the axle using various fastening mechanisms, including, but not limited to, various types of screws and/or bolts.

Thus, during operation of the remote vehicle 450, the wheel structures 100 may absorb both radial and axial forces to prevent damage to the wheels and/or the chassis of the remote vehicle 450. As stated above, the spokes of a wheel structure 100 may, for example, absorb energy from radial shocks to the wheel structure 100 (i.e., deflect in a radial direction) by deforming in three axes. Slits in the spokes of the wheel structure 100 may also effectively reduce the axial stiffness of the spokes, thereby increasing the resilience of the wheel structure 100 against axial shocks (i.e., side impacts) when the remote vehicle 450 rolls or is dropped and/or thrown.

Furthermore, the flipper structures 200 may transmit energy (i.e., axial shock) to the wheel structures 100 to prevent damage to the flippers when the remote vehicle 450 rolls or is dropped and/or thrown. As above, a flipper structure 200 may, for example, have a plurality of legs, wherein the plurality of legs (in conjunction with an attachment base) effectively form a four-bar linkage between an arm of the flipper structure 200 and a wheel structure 100. As would be understood by those of ordinary skill in the art, the four-bar linkage may allow translation of the arm during a side impact (i.e., allowing the arm to safely collapse into the wheel structure 100), while also providing adequate rotational stiffness to lift the remote vehicle 450 during normal vehicle operation.

As discussed above, resilient wheel assemblies, including wheel structures, flipper structures, and inserts, in accordance with the present teachings are useful in various applications and are scalable, for example, to any size vehicle, such as, for example, any size remote vehicle, allowing for improved vehicle shock absorption. It will be appreciated by those of ordinary skill in the art having the benefit of this disclosure that the present teachings provide wheel assembly embodiments for various robotic vehicles. Further modifications and alternative embodiments of various aspects of the present teachings will be apparent to those skilled in the art in view of this description.

In both military and industrial settings, personnel often encounter dangerous situations where intelligence of what lies ahead could save lives. Dismounted military patrols can use a lightweight, portable robot to maneuver into small spaces prone to ambush, and inspect potential threats, including suspected improvised explosive devices (IEDs). A small search robot can also be used to assess situations before exposing personnel to harm. In industrial settings, emergency personnel can pre-position or insert a small inspection robot in hazardous spaces to evaluate the situation before humans enter the area. And a small search robot can evaluate the extent of danger before rescue teams enter sealed areas in mining operations, chemical plants, or nuclear reactors. Embodiments of a remote vehicle in accordance with the present teachings can provide a lightweight, man-portable search robot designed to help keep military personnel out of harm's way. Readily deployable and extremely maneuverable, embodiments of a remote vehicle in accordance with the present teachings can serve as a forward-looking eye that travels ahead of dismounted military forces or industrial emergency personnel, and can indicate the presence of IEDs, enemy combatants, and other potential hazards An exemplary embodiment of a remote vehicle, such as, for example, a small search robot, in accordance with the present teachings is illustrated, for example, in FIGS. 14 and 15. The table below also provides general specifications for an exemplary embodiment of a remote vehicle in accordance with the present teachings.

| Specification | Description |
| --- | --- |
| System Components | FirstLook robot, Operational Control Unit (OCU), PDA controller, and charging dock equipment. |
| Portability | 10 × 9 × 4 inches, and approximately four pounds. |
| Ruggedness | Designed for 15-foot drops onto concrete without a protective case. |
| Maneuverability | Climbs steps and curbs, self-rights when inverted, and turns in place with skid-steer tracks. |
| Waterproof | Waterproof to three feet (IP67). |
| High Situational Awareness | Four cameras point in all four cardinal directions with configurable video compression. |
| Night Vision | IR illumination for night operations. |
| Audio Communication | Two-way audio. |
| Operational Control Unit (OCU) | Wrist-mounted with built-in radio and batteries to support full robot mission. |
| Radio Communication | Digital mesh networking allows multiple units to relay messages over greater distances. |
| Military Band | Optional 4.5-GHz military band. |
| Runtime | Over six hours on a typical mission; and up to 10 hours of stationary video monitoring. |
| Payload Expansion | Optional robot payload expansion allows integration of specialized cameras and sensors and thermal imagers, chem-bio-radiation sensors, and destructive payloads up to one-half pound. |

Multiple robots in accordance with the present teachings can, for example, form mesh networks to help solve radio-range challenges in urban environments. One or more robots in accordance with the present teachings can be interoperable with an entire fleet of robots and controllers allowing one operator to control multiple robots. Interoperability can, for example, enable cooperative and marsupial missions involving heterogeneous robot platforms using, for example, an advance behavior engine such as iRobot's® Aware® 2 Robot Intelligence Software technology. Robot interoperability provides a decisive step toward building cost-effective, multi-robot systems that can adapt to a wide variety of real-world challenges.

Remote vehicles in accordance with the present teachings have significant applications in both short-range military and civilian industrial settings. Such remote vehicles are designed, for example, to enter dangerous, dirty, and confined spaces to keep humans out of harm's way.

Systems in accordance with the present teachings can comprise, for example, a robot, an operator control system (OCU), and charging dock equipment. At a military base, while awaiting a mission, an operator may, for example, set up the robot and controller to charge the robot's batteries. When preparing for a mission, the robot and its controller are removed from the charging dock and stowed in a backpack, vest-mounted pouch, or similar carrying device. During a combat mission, the robot remains conveniently stowed away until needed for a short-range reconnaissance mission. When needed, the robot is removed from its carrying compartment and activated. The robot is preferably a throwable robot and can be tossed down a corridor, into a window, or up a stairwell. The robot can absorb impact forces as described above and, after landing, can right itself as needed and be remotely operated. Video feed can be evaluated before determining the next course of action.

Using a robot in accordance with the present teachings can, for example, reduce collateral casualties by allowing military personnel to determine the degree of hostile intent before entering a dangerous environment. The robot can also look for and determine the presence of booby traps and IEDs. In various additional embodiments of the present teachings, several robots can be utilized to extend the range of operations by acting as radio-relay nodes. A wider area of radio coverage can be provided if a robot is tossed onto a roof top or other high locations with good visibility.

In non-military applications, systems in accordance with the present teachings can, for example, be permanently installed at floor level inside a containment building, where the robot can charge in its charging dock. When an incident occurs, remote personnel can deploy the robot from its charging dock to evaluate, for example, the extent and type of an incident. The robot can, for example, autonomously return to its charging dock when the mission is completed.

In a civilian industrial setting, a home inspector can keep the robot in a wall-mounted charging dock inside an equipment truck until needed. Thus, when arriving on site, the robot is charged and ready for deployment. The inspector can, for example, remove the robot from its charging dock, and use it for evaluation tasks, such as under-house or storm drainage system inspection. After use, the robot can be returned to its charging dock.

Various embodiments of a system in accordance with the present teachings may further include training documentation, and can fit into a small box weighing less than 10 pounds for ease of shipment. Optionally, the system can be shipped in, for example, a rugged waterproof case, commonly referred to as a Pelican case.

Various embodiments of the robot may, for example, have a small, flat-form factor with two tracks, similar to a small tank. The robot also preferably has side flippers, such as the flippers discussed above, which can rotate 360° around their axles.

In various embodiments of the present teachings, the robot can climb stairs and curbs. The robot's platform can be, for example, about 10×9×4 inches, weigh about four pounds, and can be dropped 15 feet on to a concrete surface without incurring structural damage that impede its mission. For power, the robot can use, for example, built-in rechargeable lithium ion batteries, which can support typical mission durations of in excess of six hours. Various embodiments of the robot can contain a small payload interface on top where optional sensors, manipulators, or other payloads can be attached. Various embodiments of the robot can, for example, accommodate a payload of up to 0.5 pound without impeded mobility. In accordance with various embodiments, the robot's motor can provide a top speed near 1.5 m/sec (3.4 mph).

In various additional embodiments of the present teachings, the remote vehicle can include a processor, such as an ARM processor, which can handle processing of commands and telemetry (JAUS/SAE AS-4 compliant), motor-control loops, video processing and compression, and assistive autonomous behaviors implemented in an advanced behavior engine such as, for example, iRobot®'s Aware® 2 software architecture. The robot can be optionally configured to be compliant with various robot interface standards, including JAUS and SAE AS-4.

In various embodiments, a set of sensors for perceiving terrain (e.g., cliffs and walls), inclinations, and orientation can be utilized to assist the operator with common tasks, relieving the need for difficult and intensive teleoperation during such tasks as climbing stairs or self-righting. In various additional embodiments, the robot can interoperate with other robot products and compatible operator control units (OCUs). Interoperability can, for example, allow the same OCU to operate two robots (the same or different) simultaneously.

In accordance with various embodiments, a small, wrist-mounted operator control unit (OCU) may include a radio, an antenna, and a battery capacity to accommodate the robot's mission life. The OCU can, for example, measure 6.5×4.5×2 inches, weigh approximately one pound, and be conveniently stowed in cargo pockets. The OCU can, for example, display all of the robot's real-time video streams simultaneously, allow direct control of the robot, and allow initiation of assorted autonomous and/or semi-autonomous behaviors. The OCU can additionally display, for example, the status of the robot's systems, including, for example, battery state of charge and flipper mechanism position. In various embodiments, the OCU can be weather resistant and be configured to operate, for example, over a temperature range of about −10° C. to about 50° C.

A robot in accordance with the present teachings is preferably a small, light-weight, tracked vehicle with trackless flippers as shown, for example, above in FIGS. 14 and 15. The flippers can be mounted to a rear axle of the robot (See FIG. 14). When the flippers are stowed, the robot can, for example, fit into an assault pack. The robot's small form factor and light weight can lend it well to throwing into restricted spaces; and no external protective device is needed to protect the robot upon landing. The present teachings contemplate several robots being carried in a single backpack. In various embodiments of the present teachings, a small, ruggedized, PDA-style controller can be provided with the robot. The controller can weigh, for example, about one pound. The robot's charging dock can, for example, fit in an assault pack with the robot and controller.

Various robots in accordance with the present teachings provide the smallest robot that can climb stairs, street curbs, and other obstacles common in urban environments. Such climbing is accomplished with the flippers as described above. Embodiments of the robot can have, as illustrated herein, four wheels, rubber elastic tracks, and a flat brick body. The flippers are capable of continuous 360-degree rotation in both directions. The flippers can self-right the robot if it inverts, and can help the robot to overcome a wide variety of obstacles that typically obstruct a small robot.

Robot embodiments in accordance with the present teachings can therefore climb stairs and crawl over rough terrain without getting stuck in rubble and debris. Various embodiments of the robot can, for example, climb 60° slopes, and traverse 45° slopes, depending on the terrain. In various additional embodiments, the flippers can help the robot cross gaps, such as, for example, over six inches in length. The tracked drive train can, for example, in some embodiments, move the robot at speeds in excess of about 1.5 meters/sec. Flipper systems in accordance with the present teachings therefore provide a high degree of mobility to the robot. The flippers' 360-degree rotation, for example, allows the robot to "swim" over rubble piles and rugged terrain that typically stop small robots with low ground clearance. The flippers can also self-right the robot when it is thrown or dropped onto a hard surface. The self-righting feature allows the robot's radio antennas and sensors to be designed into the top of the robot for superior visibility. The ability to position payloads and antennas on top of the robot is not available on existing invertible robot systems that do not have flippers.

Various embodiments of a robot in accordance with the present teachings are waterproof, for example, to IP67, and operate over a wide temperature range. The robot's low form factor can also make it resistant to very high winds, such as, for example, in excess of 45 mph, with little degradation of mission performance. As stated above, various embodiments of the robot can operate in temperatures ranging from about −10° C. to about 60° C., with the operational temperature range being largely dictated by current lithium ion battery technology as would be understood by those of ordinary skill in the art.

In various embodiments in accordance with the present teachings, the robot's charging dock can utilize, for example, 110-250 VAC 50-60 Hz. The robot can also operate using an optional 12-28 VDC charger. The small size and low cost of the robot will allow personnel to carry spare robots instead of spare batteries, if extended mission runtime is expected.

In various embodiments, the robot's radio can comprise, for example, a USB module, and can support bidirectional digital communications and mobile ad hoc mesh networking. The default radio can operate, for example, on a frequency of 5.8 GHz, and have a line-of-sight range in excess of 200 meters. The radio can also support operations on 2.4 GHz or a wider variety of frequencies. The robot can optionally be equipped with a radio supporting a military band of 4.475-4.725 GHz with 200 m range. The radio can be connected to a flexible antenna mounted on top of the robot with a unique collapsible mast as described in U.S. patent application Ser. No. 13/340,456 (filed Dec. 29, 2011; entitled "Antenna Support Structures"), the entire contents of which are incorporated by reference herein.

When the robot flips over or onto its side, an autonomous self-righting behavior can be utilized to self-right the robot to allow its flexible antenna to regain its upright position.

In accordance with various embodiments of the present teachings, in areas where RF performance may be degraded by background noise, or obstructed by terrain, several robots can be used together as relay nodes to extend the operational range. If the first robot reaches its RF communications limit, a second robot can be deployed to drive past the first robot into an inaccessible area, utilizing the first robot as a radio-relay node. The mesh networking capability can be built into some embodiments of the robot.

In various embodiments of the present teachings, organic sensors can be mounted on the robot including, for example: a battery state of charge sensor; a voltage sensor; an amperage sensor; a tilt/inclination and bump sensor; a cliff detector; a wall following sensor; a yaw-angular rate sensor (i.e., to detect slippage and enhance odometry); a motor current sensor; and a flipper position sensor. In various additional embodiments, the robot can have on-board logging of diagnostic data, and can warn the operator of potential impending system failures requiring maintenance. The robot's autonomous capabilities can include, for example, one or more of the following.

Self-righting—a built-in, autonomous, self-righting behavior. When the robot is on and left undisturbed in the inverted position, the flippers activate in a series of maneuvers to upright the robot to ensure the antennas are returned to the upright position.

Step climbing—the robot can climb steps. To facilitate step climbing, the robot can have a built-in assistive behavior initiated by the remote operator once the robot is positioned in front of the step. The assistive behavior executes the required sequence of motions required to climb the step based upon the feedback from the internal sensors.

Cliff detection—due to the low perspective of the robot's cameras, it is often difficult to see when the robot is driving towards a drop off, such as the top of a flight of stairs or the edge of a platform. To assist the operator in such situations, the robot can have built-in cliff sensors which are utilized in a protected driving mode. If the operator drives the robot too close to the edge of a stairwell or cliff, the robot stops, and verifies that the operator is aware of the drop off by projecting a warning message on the OCU. The operator can then decide to turn away from the edge, or to proceed and drive over the ledge.

Wall following—to facilitate searching a room or space, the operator can command the robot to follow a wall clockwise or counter clockwise around a room's perimeter. The robot autonomously drives around the perimeter hugging the base of the wall.

Video Guard Mode—the robot can be configured in a low-power, standby mode. In this mode, the robot wakes up, and transmits an alert if it sees any motion. This mode can be useful when securing an area in a leave-behind scenario.

Certain embodiments of the robot can contain an expansion port for the addition of future payload modules on top where optional payloads, manipulators, or destructive payloads are attached. The robot can, for example, accommodate a payload of up to about 0.5 pounds without impeded mobility. Payload expansion can allow integration of specialized cameras and sensors, including thermal imagers, chem-bio-radiation sensors, and destructive payloads.

The remote vehicle embodiments described herein can also include additional components that were omitted from the drawings for clarity of illustration and/or operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts may be reversed, and certain features of the present teachings may be utilized independently, all as would be apparent to one skilled in the art after having the benefit of the description herein. Changes may be made in the elements described herein without departing from the spirit and scope of the present teachings and following claims, including their equivalents.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about" if they are not already. Accordingly, unless indicated to the contrary, the numerical parameters set forth in the following specification and attached claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the present teachings have been described in detail with respect to various exemplary embodiments thereof, it should not be considered limited to such, as numerous modifications are possible without departing from the broad scope of the appended claims, including the equivalents they encompass.

What is claimed is:

1. A wheel assembly for a vehicle, the wheel assembly comprising:
    a wheel structure including:
        a continuous, annular rim;
        a hub; and
        a plurality of spokes interconnecting the rim and the hub, the spokes comprising at least one slit extending therethrough radially inward from the rim to the hub, wherein the spokes are configured to absorb radial and axial forces, and wherein the at least one slit is configured to reduce an axial stiffness of the spokes; and
    a flipper structure coupled to the wheel structure, the flipper structure including:
        an arm having a proximal end and a distal end;
        a plurality of legs coupled to the proximal end of the arm; and
        an attachment base coupled to the plurality of legs, wherein the plurality of legs and the attachment base comprise a four-bar linkage configured to allow translation of the arm during impacts and provide rotational stiffness to the arm to lift the vehicle.

2. The wheel assembly of claim 1, wherein the vehicle is a remote vehicle.

3. The wheel assembly of claim 1, wherein the rim comprises an inner rim, an outer rim, and at least one rib connecting the inner rim and the outer rim.

4. The wheel assembly of claim 1, wherein the plurality of spokes comprise three slits extending therethrough radially inward from the rim to the hub.

5. The wheel assembly of claim 1, wherein each spoke of the plurality of spokes comprises three spoke portions, each spoke portion having a different curvature, and wherein the spoke curvature is configured to eliminate inflection points.

6. The wheel assembly of claim 1, wherein the at least one slit forms a plurality of spoke layers within each spoke, the spoke layers being axially offset from one another around the hub.

7. The wheel assembly of claim 6, wherein the at least one slit comprises three slits forming four spoke layers within each spoke.

8. A flipper structure for a vehicle, the flipper structure comprising:
   an arm having a proximal end and a distal end;
   a plurality of legs coupled to the proximal end of the arm; and
   an attachment base coupled to the plurality of legs,
   wherein the legs and attachment base comprise a four-bar linkage, and
   wherein the four-bar linkage is configured to allow translation of the arm during impacts and provide rotational stiffness to the arm to lift the vehicle.

9. The flipper structure of claim 8, wherein the vehicle is a remote vehicle.

10. The flipper structure of claim 8, wherein the arm comprises an inner surface and an outer surface, a thickness of the arm being tapered between the proximal and the distal end of the arm so that the distal end of the arm is thinner than the proximal end of the arm.

11. The flipper structure of claim 10, wherein the inner surface is configured to slant away from the vehicle to form a space between the arm and the vehicle, the space being configured to prevent the distal end from contacting another portion of the vehicle and prevent debris from getting lodged between the arm and the vehicle, and wherein the outer surface is configured to be parallel to the vehicle.

12. The flipper structure of claim 8, wherein the arm comprises at least one hole configured to mount an object and/or a payload.

13. The flipper structure of claim 8, wherein the flipper arm comprises a V-shaped cross-section extending along a longitudinal axis of the flipper structure between the proximate end of the arm and the distal end of the arm.

14. The flipper structure of claim 8, wherein the plurality of legs comprise three legs.

15. An insert for a flipper structure, the insert comprising an annular bushing configured to provide a robust interface between an axle and the flipper structure, the bushing comprising a bore with a flat surface that tapers outward from a top portion of the bushing to a bottom portion of the bushing, wherein the flat surface is configured to prevent backlash between the axle and the flipper structure.

16. The insert of claim 15, wherein the flat surface is offset from an axis of the insert by at least about 15 degrees.

17. The insert of claim 16, wherein the flat surface is offset from the axis by about 16 degrees.

18. A wheel assembly for a remote vehicle, the wheel assembly comprising:
   a wheel structure comprising a plurality of spokes interconnecting a rim and a hub, the spokes comprising at least one slit extending therethrough radially inward from the rim to the hub;
   a flipper structure comprising an arm, a plurality of legs, and an attachment base, the plurality of legs and the attachment base comprising a four-bar linkage; and
   an insert comprising a bore with a flat surface that tapers outward from a top portion of the insert to a bottom portion of the insert, the insert being configured to couple the flipper structure to the wheel structure via an axle on the remote vehicle,
   wherein the insert is configured to prevent backlash between the axle and the flipper structure,
   wherein the flipper structure is configured to transmit axial forces to the wheel structure, and
   wherein the wheel structure is configured to absorb radial and axial forces.

* * * * *